Patented July 8, 1952

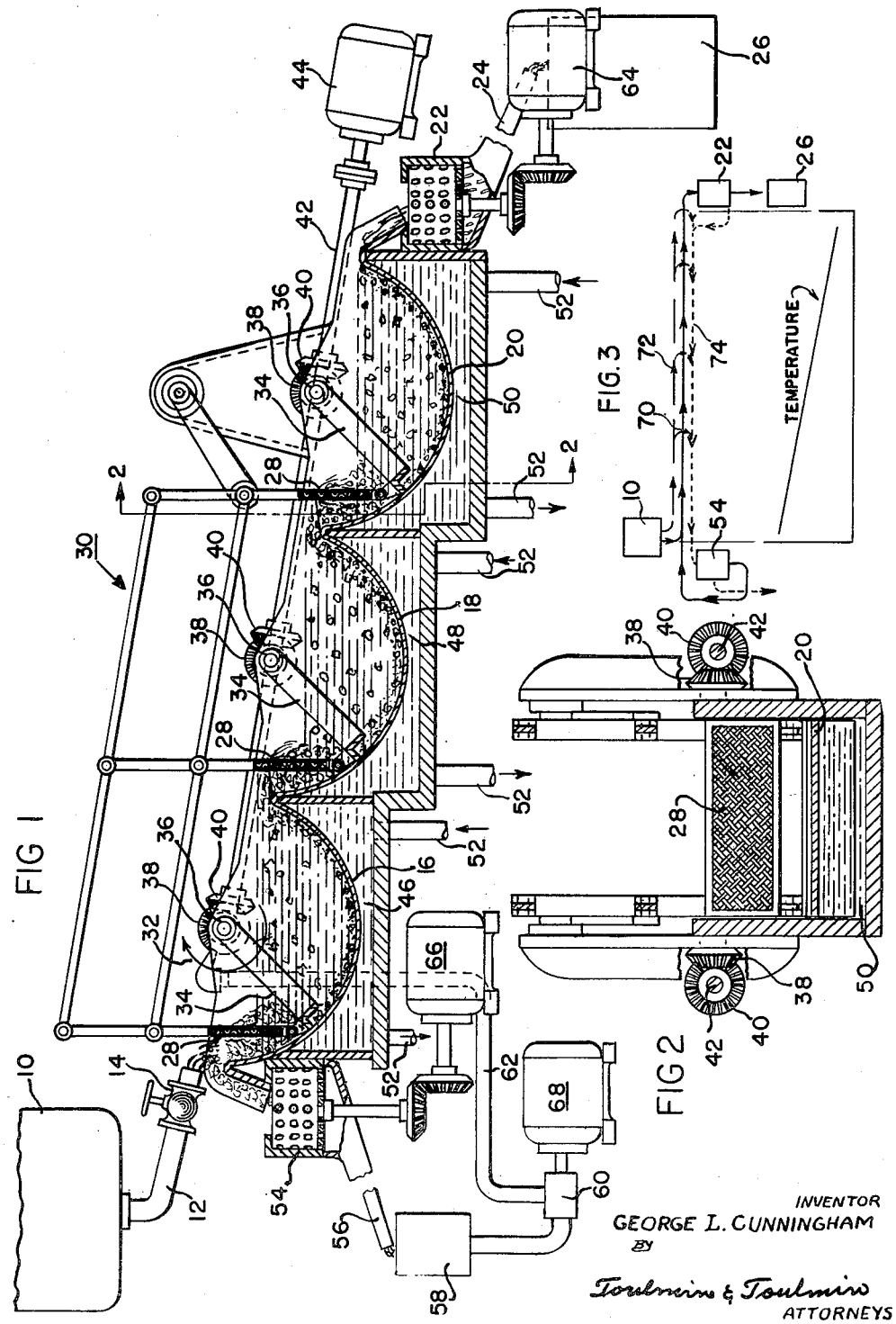

2,602,745

UNITED STATES PATENT OFFICE 2,602,745

METHOD OF CONCENTRATING MILK

George L. Cunningham, Cincinnati, Ohio, assignor to The Commonwealth Engineering Company of Ohio, Dayton, Ohio, a corporation of Ohio Application June 24, 1949, Serial No. 101,236

5 Claims. (Cl. 99—55)

My invention relates to a milk concentrate and the process of making it.

Concentrated milks, in the form of dried, evaporated, or condensed milk, are well known, but, heretofore, none of these products could be made without substantial changes in the flavor, texture, or aroma which greatly detracted from the palatability of the product when restored to its original concentration by the addition of water. In general, this change in taste, texture and aroma, was due to chemical changes in the milk, or to the loss therefrom of volatile flavoring substances when heat or vacuum, or a combination of both, was applied to the milk to cause evaporation of water therefrom. So far as the applicant knows, all present-day commercial processes for concentrating milk are characterized by removing water therefrom by evaporation, and, thus, all present-day commercial condensed, evaporated, or dried milk products are characterized by substantial and undesirable flavor changes.

The primary object of this invention is to provide a concentrated milk product and a method of making it characterized by the product having the same flavor as the original milk when water is added.

Another object is the provision of a method of concentrating milk without the use of evaporating techniques, and of a product made in that manner.

Another object of my invention is to provide concentrated whole milk without breaking the emulsion, and without precipitating the butterfat.

It is a further object of my invention to provide a concentrated milk product having a concentration of solids of not less than twenty-six per cent and preferably of approximately thirty-eight per cent.

It is also an object of the invention to produce such a concentrate of milk in either unfrozen or frozen form capable of being reconstituted to its initial concentration by the addition of the same amount of water that has been extracted, and characterized by no change in taste from the original milk.

Still another object of the present invention is to provide such a product which has nothing except water removed from it, so that its original vitamin, mineral, and butterfat composition is undisturbed.

It is an object of my invention to provide such a reduction in volume of whole milk that it can be supplied in either unfrozen or frozen form, in such a relatively small package as compared with its original bulk as greatly to reduce the cost of packaging, the cost of distribution, and the frequency of distribution to the consumer.

It is a further object of my invention to provide a whole milk concentrate which can easily be preserved over long periods without deterioration.

It is a further object of the invention to provide such a product, and the process of making it, so that the concentrated product may enter into a subsequent process of making powdered milk or evaporated milk, eliminating from such products the change in taste now so objectionable in dried milk and in evaporated milk.

These and other objects and advantages will become more apparent upon reference to the following description taken in connection with the accompanying drawings in which:

Figure 1 is a diagrammatic view showing one form of apparatus adapted for carrying out my invention;

Figure 2 is a section on line 2—2 of Figure 1 showing the apparatus in cross-section; and Figure 3 is a chart diagrammatically illustrating the carrying out of a process according to my invention.

Referring to the drawings, the apparatus shown therein is one which I have found adapted for practicing the method of this invention, and by means of which a product according to this invention can be produced.

The substance to be concentrated may be placed in a container 10, whence it flows through pipe 12 and control valve 14 into a trough-like element 16, in which the first step of the process according to my invention is carried out.

As mentioned previously, this invention is primarily concerned with the concentration of milk, and this may be either whole milk or skimmed milk, according to the final product desired.

The trough-like element 16 is arranged in cascade with two other similar elements 18 and 20, so the milk which enters the left side of element 16 will overflow the right end thereof into element 18, and then overflow the right end of element 18 into element 20. The right end of element 20 is arranged to overflow into a centrifuge 22 and then to pass therefrom through conduit 24 into a suitable receiving container 26.

According to this invention, each of the trough-like elements 16, 18, and 20 has associated therewith a screened barrier member 28, and all of the elements 28 are interconnected by a parallel motion linkage, generally indicated at 30, and by means of which the barrier members can be moved in a circuitous path in the direction indicated by arrow 32.

The barrier members 28 are supported on crank arms 34 that are fastened to shafts 36 mounting bevel gears 38 that mesh with other bevel gears 40 on a drive shaft 42 drivingly connected with motor 44. It will be apparent that energization of motor 44 will cause rotation of crank arms 34 and movement of the screened barrier members 28 in a circuitous path clockwise.

Each of the trough-like elements 16, 18, and 20 is placed in a suitable container and refrigerant circulated thereabout. The containers are indicated at 46, 48, and 50, and each thereof has inlet and outlet pipes, as indicated at 52.

The purpose of the refrigerant circulated through the above-mentioned containers is to chill the milk within the trough-like elements until ice crystals form therein. It is a well-known fact that the ice crystals formed when any aqueous solution, mixture, or emulsion is chilled to the freezing point are pure ice.

Ordinarily, and such is the case with milk, the ice formation is in the form of very tiny crystals, and as the milk freezes and these tiny crystals become multiplied, they hold in physical combination with them the other milk products, so that, while frozen milk is characterized by the water being separated from the other parts of the milk in that it has been converted to pure ice crystals, it has been found impossible physically to extract the water. This is due to the fact that the very great surface of the tiny ice crystals in frozen milk retain enough of the other parts of the milk thereon as a surface coating, that only a very small and commercially impractical amount free of the water can be taken therefrom.

The method according to the present invention consists primarily of chilling the milk until ice crystals commence to form therein and then setting up counterflow movement of the ice crystals and the milk, so the ice crystals are continuously moved toward more and more dilute milk, and in this manner are encouraged to grow to a substantial size. These larger crystals can readily be removed from the milk and carry with them only a small amount of the milk, because their surface area is relatively small as compared to their volume.

Referring again to Figure 1, the milk which is introduced into trough-like element 16 at the left side thereof is chilled within the said element to a temperature of about −3 degrees centigrade. As the milk moves rightwardly toward element 16 toward its point of overflow into element 18, ice crystals will commence to form therein. If these crystals are small enough to pass through barrier member 28, then they will overflow with the milk into element 18. However, if the crystals are of such a size that they will be caught by barrier 28, then they will be moved thereby toward the point of entry of milk into element 16 and discharged from the said element to centrifuge 54.

Within centrifuge 54 the milk entrained with the ice crystals is separated therefrom and flows through conduit 56 into chamber 58 and is pumped therefrom by pump 60 through conduit 62 and back into element 16.

The milk which flows into element 18 is chilled to a lower temperature than that in element 16 because the milk in element 18 is now somewhat concentrated and a lower temperature must be attained before ice crystals will form or grow therein. The actual temperature to which the milk is reduced in element 18 is about −15 degrees centigrade. Within element 18, the process continues with ice crystals forming and growing therein, and those which are small enough to pass through barrier 28 pass on to element 20, while those large enough to be caught by barrier member 28 are transferred back into element 16 to be caught by the barrier member 28 therein and conveyed to centrifuge 54.

Within element 20, the milk, now fairly concentrated, is reduced to that temperature which will cause ice crystals to form and grow, this temperature being in the neighborhood of −25 degrees centigrade. The same action takes place within element 20 as takes place within elements 16 and 18, and a substantial amount of ice crystals is moved by barrier member 28 from element 20 into element 18, while some fine ice crystals will be discharged from the right side of element 20 into centrifuge 22.

It is to be noted at this time that the ice is always moving in counterflow relationship with the milk, and that the ice crystals are removed from the system at the point of entry therein of the milk to be concentrated. This causes the crystals to be washed in the most dilute milk available in the system and reduces to a substantial degree the amount of carry out of milk by the crystals.

It is also to be noted that once the system has become stabilized, most of the initial crystal formation takes place in elements 18 and 20, with substantially all of the water taken from the milk in element 16 going to crystal growth and a substantial amount of the water taken from the milk in element 18 going for the same purpose.

It will be apparent that while I have shown and described a three-step process for concentrating milk by freezing, as many steps as necessary could be employed, or the process could be carried out as a continuous cycle. The essential thing is that the milk is moved in one direction and subjected to progressively decreasing temperatures, while the ice formed in the milk is moved in counterflow relationship therewith and removed from the milk stream at the entry thereof into the system.

Referring briefly to the drawings again, centrifuge 22 is adapted for operation by a motor 64, centrifuge 54 is adapted for operation by motor 66, and pump 60 is adapted for operation by motor 68.

Figure 2 is a cross-sectional view indicating how the barrier member 28 extends from side to side of the trough-like element in which it is placed, so as to form an effective means for removing all ice crystals above a predetermined size from the milk stream passing through the said element.

In Figure 3 there is diagrammatically illustrated the carrying out of a process according to this invention. In this figure, the solid line indicated at 70 represents the part of the milk which it is desired to retain in the product, while the dashed line at 72 indicates the water it is desired to remove from the milk. It will be seen in Figure 3 that the water and milk leave container 10 together and then pass along a path which is continuously lower in temperature. The water represented by line 72 is gradually converted to ice, and when the crystals reach a certain size, the direction of movement of the water is reversed, and it then passes in counterflow relationship with the milk, as represented by the dotted line 74. At the left end, the ice is centrifuged in centrifuge 54, and the milk removed therefrom is returned to the system, while at the right end, the milk product is centrifuged in centrifuge 22, and the ice removed therefrom and preferably returned to the system to effect a heat economy.

The concentrated product delivered to the container 26 may then be packaged for distribution in either a frozen or unfrozen state, or it may be passed through other processes in order to reduce it to a dried product or to further concentrate it for some particular purpose.

In any case, the advantage obtains that when the product is restored to its initial concentration by the addition of water, the flavor is unchanged. Due to the fact that the water is removed solely by a freezing process, the vitamins and the flavor and aroma producing substances are not changed or removed from the milk. Also, since the milk is continuously kept in motion during its concentration and the crystal growth therein is at a relatively slow rate, there is no breakdown of the emulsion and no precipitation or coagulation of the butterfat.

It will be understood that I do not wish to be limited to the exact proportions, ratios, and other factors specifically set forth in the foregoing description and the accompanying drawings but desire to comprehend such changes thereof as may be further desirable to adapt my invention to different conditions and usages.

I claim:

1. A method of treating liquid food stuffs to produce a concentrate thereof which comprises the steps of (a) flowing said liquid food stuff in the form of a cascade through a plurality of freezing treatment stages and whereby the liquid food stuff being concentrated passes from one freezing treatment stage to another down the series, (b) subjecting said liquid food stuff in each stage to a freezing treatment and sufficient to cause the formation of ice crystals, (c) removing a portion of said ice crystals from each treatment stage as the liquid food stuff cascades down through the series of freezing treatment stages, (d) transferring the ice crystals removed from one treatment stage to the preceding treatment stage, and (e) treating the resultant liquid food stuff after passing through said cascade series of freezing treatments to remove the remaining ice crystals therefrom to produce a concentrated liquid food stuff.

2. A method of treating liquid food stuffs to produce a concentrate thereof which comprises the steps of (a) flowing said liquid food stuff in the form of a cascade through a plurality of freezing treatment stages and whereby the liquid food stuff being concentrated passes from one freezing treatment stage to another down the series, (b) subjecting said liquid food stuff in each stage to a freezing treatment and sufficient to cause the formation of ice crystals, (c) removing a portion of said ice crystals from each treatment stage as the liquid food stuff cascades therealong down through the series of freezing treatment stages, (d) transferring the ice crystals removed from one stage of treatment to the next preceding treatment and in a direction counter to the cascading liquid food stuff, and (e) removing ice crystals from the initial stage treatment and centrifuging the same to remove liquid food stuff therefrom, and (f) treating the resultant liquid food stuff after passing through said cascade series of freezing treatments to remove the remaining ice crystals therefrom to produce a concentrated liquid food stuff.

3. A method of treating milk to produce a concentrate thereof which comprises the steps of (a) flowing said milk in the form of a cascade through a plurality of freezing treatment stages and whereby the milk being concentrated passes from one freezing treatment stage to another down the series, (b) subjecting said milk in each stage to a freezing treatment and sufficient to cause the formation of ice crystals, (c) removing a portion of said ice crystals from each treatment stage as the milk cascades down through the series of freezing treatment stages, (d) transferring the ice crystals removed from one treatment stage to the preceding treatment stage, and (e) treating the resultant milk after passing through said cascade series of freezing treatments to remove the remaining ice crystals therefrom to produce a concentrated milk.

4. A method of treating milk to produce a concentrate thereof which comprises the steps of (a) flowing said milk in the form of a cascade through a plurality of freezing treatment stages and whereby the milk being concentrated passes from one freezing treatment stage to another down the series, (b) subjecting said milk in each stage to a freezing treatment and sufficient to cause the formation of ice crystals, (c) removing a portion of said ice crystals from each treatment stage as the milk cascades therealong down through the series of freezing treatment stages, (d) transferring the ice crystals removed from one stage of treatment to the next preceding treatment and in a direction counter to the cascading milk and (e) removing ice crystals from the initial stage treatment and centrifuging the same to remove milk therefrom, and (f) treating the resultant milk after passing through said cascade series of freezing treatments to remove the remaining ice crystals therefrom to recover a concentrated milk.

5. A method of treating milk to produce a concentrate thereof which comprises the steps of (a) flowing said milk in the form of a cascade through a plurality of freezing treatment stages and whereby the milk being concentrated passes from one freezing treatment stage to another down the series, (b) subjecting said milk in each stage to a freezing treatment and sufficient to cause the formation of ice crystals, (c) removing a portion of said ice crystals and constituting the bulk of the larger size crystals from each treatment stage as the milk cascades down through the series of freezing treatment stages, (d) transferring the ice crystals removed from one treatment stage to the preceding treatment stage, and (e) treating the resultant milk after passing through said cascade series of freezing treatments to remove the remaining ice crystals therefrom to recover a concentrated milk.

GEORGE L. CUNNINGHAM.

REFERENCES CITED

The following references are of record in the file of this patent:

UNITED STATES PATENTS

| Number | Name | Date |
| --- | --- | --- |
| 523,677 | McIntyre | July 31, 1894 |
| 723,152 | Gurber | Mar. 17, 1903 |
| 994,555 | Alexander | June 6, 1911 |
| 1,576,137 | Johnson | Mar. 9, 1926 |
| 1,738,275 | Baker | Dec. 3, 1929 |